(12) United States Patent
Kim et al.

(10) Patent No.: US 11,880,099 B2
(45) Date of Patent: Jan. 23, 2024

(54) SUBSTRATE TREATING APPARATUS AND SUBSTRATE TREATING METHOD

(71) Applicant: SEMES CO., LTD., Chungcheongnam-do (KR)

(72) Inventors: Seon Beom Kim, Gyeongsangbuk-do (KR); Hun Sub Lim, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 177 days.

(21) Appl. No.: 17/507,026

(22) Filed: Oct. 21, 2021

(65) Prior Publication Data

US 2022/0128844 A1    Apr. 28, 2022

(30) Foreign Application Priority Data

Oct. 22, 2020    (KR) .......................... 10-2020-0137796

(51) Int. Cl.
  *G02F 1/13*    (2006.01)
  *G02F 1/1333*    (2006.01)

(52) U.S. Cl.
  CPC ...... *G02F 1/1303* (2013.01); *G02F 1/133308* (2013.01)

(58) Field of Classification Search
  CPC .......................... G02F 1/1303; G02F 1/133308
  See application file for complete search history.

(56) References Cited

FOREIGN PATENT DOCUMENTS

| KR | 1020110097615 A | 8/2011 |
|----|----|----|
| KR | 1020120098405 A | 9/2012 |
| KR | 1020140084738 A | 7/2014 |
| KR | 1020140145924 A | 12/2014 |
| KR | 1020140148162 A | 12/2014 |

OTHER PUBLICATIONS

Machine translation of KR 100806224 (Year: 2008).*

* cited by examiner

*Primary Examiner* — Lucy P Chien
(74) *Attorney, Agent, or Firm* — PROCOPIO, CORY, HARGREAVES & SAVITCH LLP

(57) ABSTRACT

Embodiments of the inventive concept provide a substrate treating apparatus and a substrate treating method. According to an embodiment, the substrate treating apparatus may include a substrate floating unit that floats a substrate, a gripping member that grips the substrate on the substrate floating unit, a nozzle unit that is located above the substrate floating unit and discharges a treatment liquid to the substrate, and an impurity removal unit that removes impurities in the substrate floating unit.

20 Claims, 8 Drawing Sheets

SUBSTRATE TREATING APPARATUS AND SUBSTRATE TREATING METHOD

CROSS-REFERENCE TO RELATED APPLICATIONS

A claim for priority under 35 U.S.C. § 119 is made to Korean Patent Application No. 10-2020-0137796 filed on Oct. 22, 2020, in the Korean Intellectual Property Office, the entire contents of which are hereby incorporated by reference.

BACKGROUND

Embodiments of the inventive concept described herein relate to a substrate treating apparatus and a substrate treating method.

In recent years, liquid crystal display devices are widely used for display units of electronic devices such as mobile phones and portable computers. In such liquid crystal display devices, a liquid crystal is injected into a space between a color filter substrate on which a black matrix, a color filter, a common electrode, and an alignment layer are formed and an array substrate on which a thin film transistor (TFT), a pixel electrode, and an alignment layer are formed, and thus an image effect is obtained using a difference in a refractive index of light according to the anisotropy of the liquid crystals.

In this way, an inkjet applying apparatus is used as an apparatus for applying a treatment liquid such as an alignment solution or a liquid crystal onto the color filter substrate and the array substrate. FIG. 1 is a cross-sectional view illustrating a general substrate treating apparatus. Referring to FIG. 1, in a process chamber 4, a substrate "S" is transferred in one direction, and a discharge head 2 supplies a treatment liquid onto the substrate "S". The discharge head 2 supplies the treatment liquid in an inkjet manner. In this case, the internal atmosphere of the process chamber 4 is maintained as an inert atmosphere by an inert gas, and a liquid supply unit having the discharge head 2 is located in the process chamber 4. While the substrate "S" is treated, the substrate "S" floats on a stage 8. A plurality of holes are provided on the stage 8, a gas pressure and a vacuum pressure are provided to the holes, and thus the substrate "S" floats to a set height. The treatment liquid discharged from the discharge head 2 and particles generated during a process are introduced into the holes formed in the stage 8. Accordingly, the treatment liquid and the particles block the holes, and thus the substrate "S" cannot float on the stage 8 at a uniform height.

SUMMARY

Embodiments of the inventive concept provide a substrate treating apparatus and a substrate treating method that may remove impurities in a stage in which a hole is provided.

The aspect of the inventive concept is not limited thereto, and other unmentioned aspects of the inventive concept may be clearly appreciated by those skilled in the art from the following descriptions.

Embodiments of the inventive concept provide a substrate treating apparatus and a substrate treating method.

According to an embodiment, the substrate treating apparatus may include a substrate floating unit that floats a substrate, a gripping member that grips the substrate on the substrate floating unit, a nozzle unit that is located above the substrate floating unit and discharges a treatment liquid to the substrate, and an impurity removal unit that removes impurities in the substrate floating unit, wherein the substrate floating unit may include a stage in which a plurality of holes are provided in an upper surface thereof, and a pressure provision member that provides a positive pressure or a negative pressure to an upper portion of the stage through the holes, wherein the impurity removal unit may include a body, a plurality of air holes formed in the body, a pressure reduction member that provides pressure reduction to the air holes, and a driver that moves the body between a removal location and a standby location, and wherein the removal location is provided in a region corresponding to the stage, and the standby location is provided in an external region of the stage.

According to an embodiment, the substrate treating apparatus may further include a controller that controls the substrate floating unit and the impurity removal unit, wherein the controller controls the impurity removal unit so that, after the substrate is removed from the stage, the impurity removal unit is moved from the standby location to the removal location to supply gas onto the stage.

According to an embodiment, the controller may control the substrate floating unit so that, after the substrate is removed from the stage, the substrate floating unit provides the positive pressure to the upper portion of the stage through the holes.

According to an embodiment, in the removal location, the air holes may be provided at locations corresponding to the holes.

According to an embodiment, the stage may have an application part that is a region in which the nozzle unit discharges the treatment liquid to the substrate, and the removal location may be provided as a location in which the body corresponds to the application part.

According to an embodiment, a cross-sectional area of the body may be provided in a size corresponding to a cross-sectional area of the application part.

According to an embodiment, the nozzle unit may include a nozzle through which the treatment liquid is supplied onto the substrate, and a gantry supporting the nozzle at a region corresponding to the application part.

According to an embodiment, the body may be located so as not to interfere with the gantry and the substrate when being moved between the standby location and the removal location.

According to an embodiment, the nozzle may discharge the treatment liquid onto the substrate in an inkjet manner.

A substrate treating apparatus may include a substrate floating unit that floats a substrate, a gripping member that grips the substrate on the substrate floating unit, a nozzle unit that is located above the substrate floating unit and discharges a treatment liquid to the substrate, and an impurity removal unit that removes impurities in the substrate floating unit, wherein the substrate floating unit may include a stage in which a plurality of holes are provided in an upper surface thereof, and a pressure provision member that provides a positive pressure or a negative pressure to an upper portion of the stage through the holes, wherein the stage may have an application part that is a region in which the nozzle unit discharges the treatment liquid to the substrate, and wherein the impurity removal unit may provide pressure reduction onto the stage in a region corresponding to the application part.

According to an embodiment, the impurity removal unit includes a body, a plurality of air holes formed in the body, a pressure reduction member that provides pressure reduction to the air holes, and a driver that moves the body between a removal location and a standby location, and the removal location may be provided in a region corresponding to the application part, and the standby location may be provided in an external region of the stage.

According to an embodiment, the substrate treating apparatus may further include a controller that controls the substrate floating unit and the impurity removal unit, wherein the controller controls the impurity removal unit so that, after the substrate is removed from the stage, the impurity removal unit is moved from the standby location to the removal location to supply gas onto the stage.

According to an embodiment, the controller may control the substrate floating unit so that, after the substrate is removed from the stage, the substrate floating unit provides the positive pressure to the upper portion of the stage through the holes.

According to an embodiment, in the removal location, the air holes may be provided at locations corresponding to the holes.

According to an embodiment, a cross-sectional area of the body is provided in a size corresponding to a cross-sectional area of the application part.

According to an embodiment, the nozzle unit may include a nozzle through which the treatment liquid is supplied onto the substrate, and a gantry supporting the nozzle at a region corresponding to the application part.

According to an embodiment, the nozzle may discharge the treatment liquid onto the substrate in an inkjet manner.

Further, embodiments of the inventive concept provide a substrate treating method. According to an embodiment, a method of treating a substrate may include treating the substrate, and after the treating of the substrate, removing impurities in the stage using the impurity removal unit, wherein in the removing of the impurities, the body is moved to a region corresponding to the application part, and pressure reduction is provided to the air holes.

According to an embodiment, in the removing of the impurities, the positive pressure may be provided to the stage.

According to an embodiment, in the treating of the substrate, the nozzle unit may supply the treatment liquid onto the substrate in an inkjet manner.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments of the inventive concept may be modified in various forms, and the scope of the inventive concept should not be construed to be limited to the following embodiments. The embodiments of the inventive concept are provided to more completely describe the inventive concept for those skilled in the art. Accordingly, the shapes of the components of the drawings are exaggerated to emphasize clearer description thereof.

Hereinafter, the embodiments of the inventive concept will be described in more detail with reference to FIGS. 2 to 8.

Figure 1:
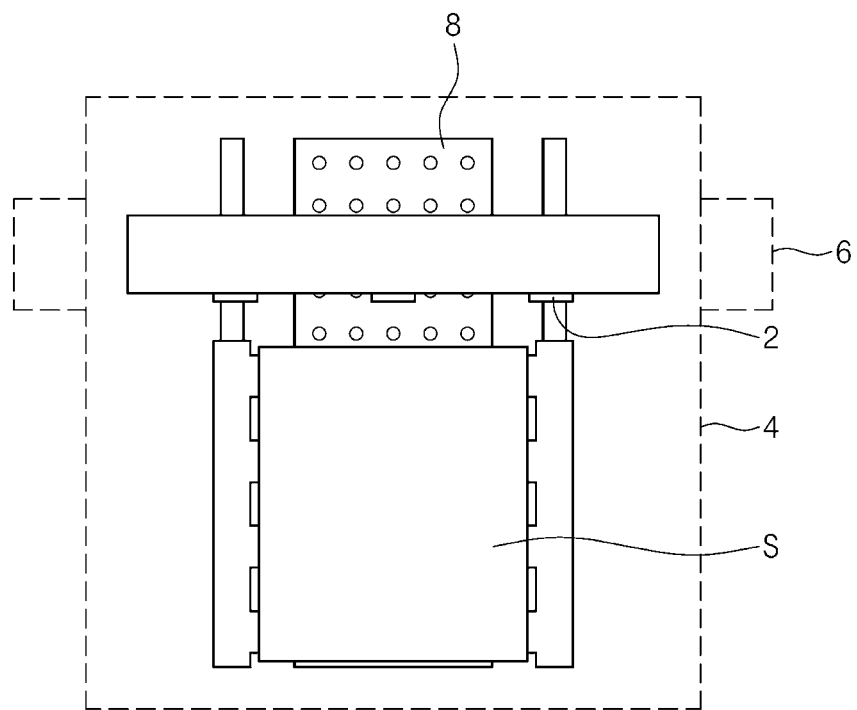
FIG. 1 is a cross-sectional view illustrating a general substrate treating apparatus.
Figure 2:
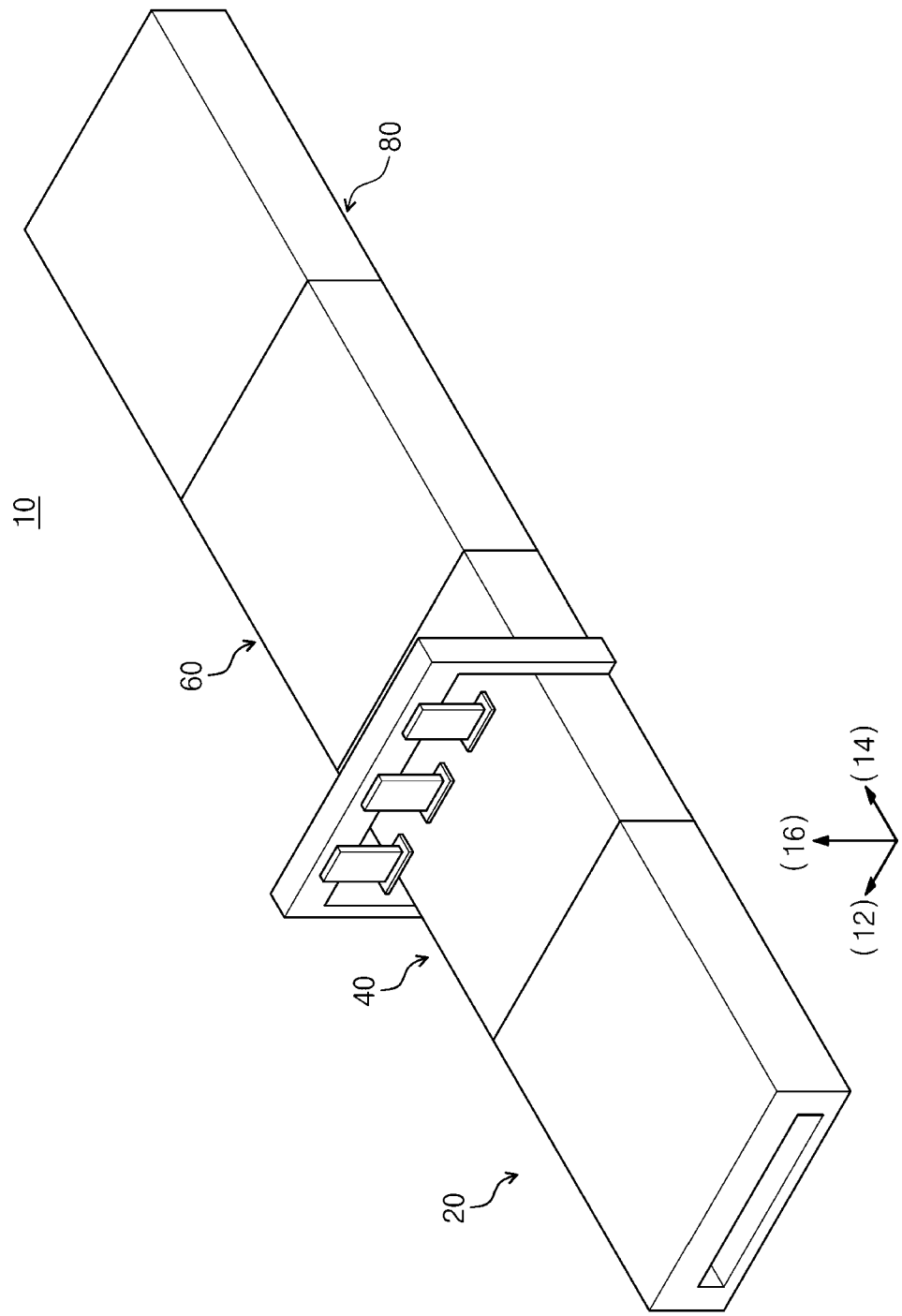
FIG. 2 is a perspective view illustrating substrate treating equipment according to an embodiment of the inventive concept.

FIG. 2 is a perspective view illustrating substrate treating equipment according to an embodiment of the inventive concept. Referring to FIG. 2, a substrate treating apparatus 10 includes a carrying-in module 20, an application module 40, and a carrying-out module 60. Each of the carrying-in module 20, the application module 40, and the carrying-out module 60 is provided to have a rectangular parallelepiped shape. When viewed from the top, each of the carrying-in module 20, the application module 40, and the carrying-out module 60 has a rectangular shape which has a width set in a first direction 12 and of which a lengthwise direction faces a second direction 14 perpendicular to the first direction 12. The carrying-in module 20, the application module 40, and the carrying-out module 60 are arranged in a line in the second direction 14. The carrying-in module 20, the application module 40, and the carrying-out module 60 are located to be adjacent to each other.

The application module 40 provides a space in which the substrate "S" is treated. In one example, an inside of the application module 40 is provided to have an atmosphere different from the atmospheric atmosphere. For example, the inside of the application module 40 is provided to have an inert atmosphere.

The carrying-in module 20 functions as an inlet through which the substrate "S" is carried into the application module 40, and the carrying-out module 60 functions as an outlet through which the substrate "S" is carried out from the application module 40. In one example, internal spaces of the carrying-in module 20, the application module 40, and the carrying-out module 60 communicate with each other and are provided to block each other. Thus, each of the carrying-in module 20, the application module 40, and the carrying-out module 60 is provided with a substrate floating unit 200 that transfers the substrate "S" in the second direction 14, and internal atmospheres of the carrying-in module 20 and the carrying-out module 60 are provided to be switchable between the atmospheric atmosphere and the inert atmosphere.

Figure 3:
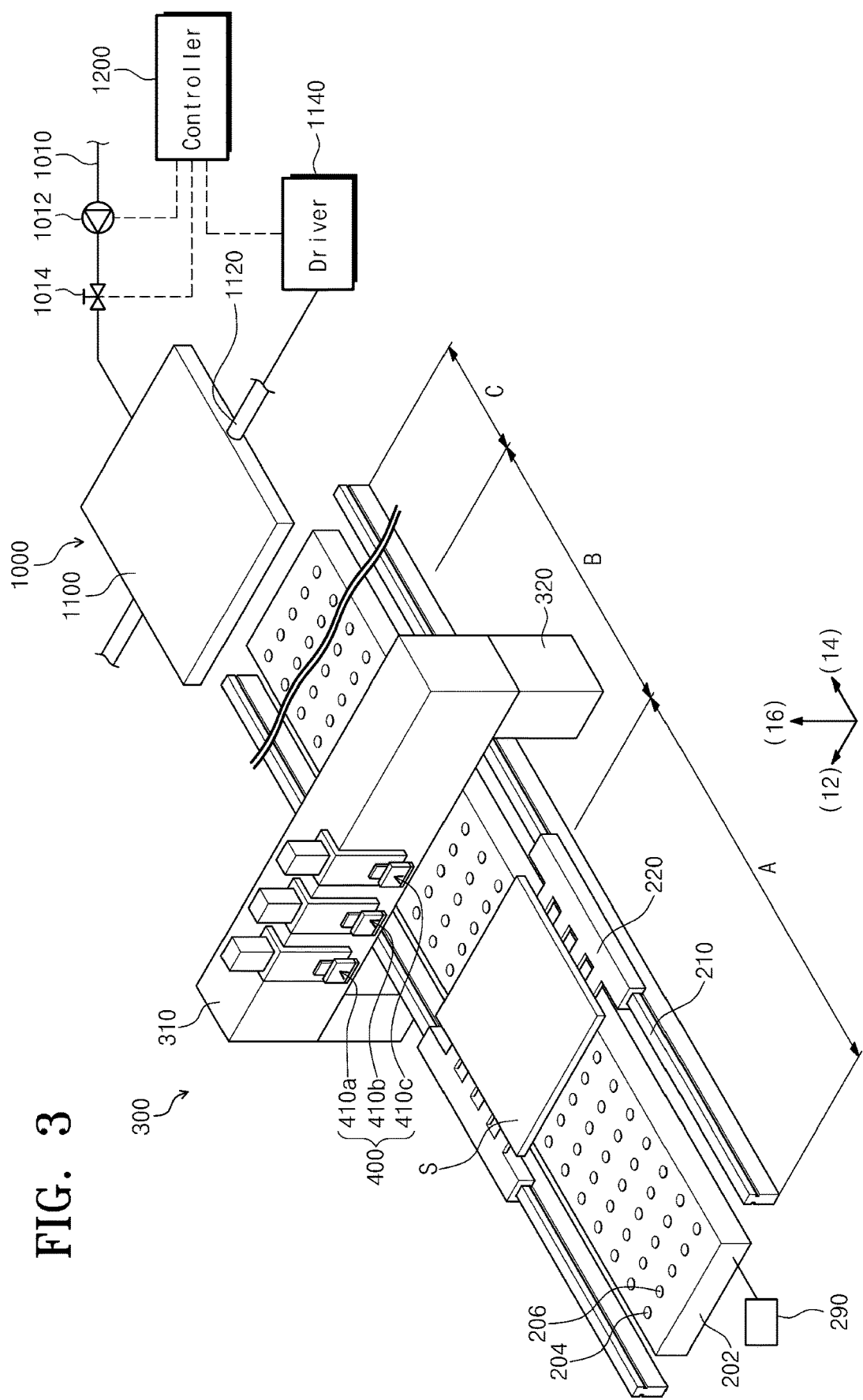
FIG. 3 is a cross-sectional view illustrating an application module of FIG. 2.
Figure 4:
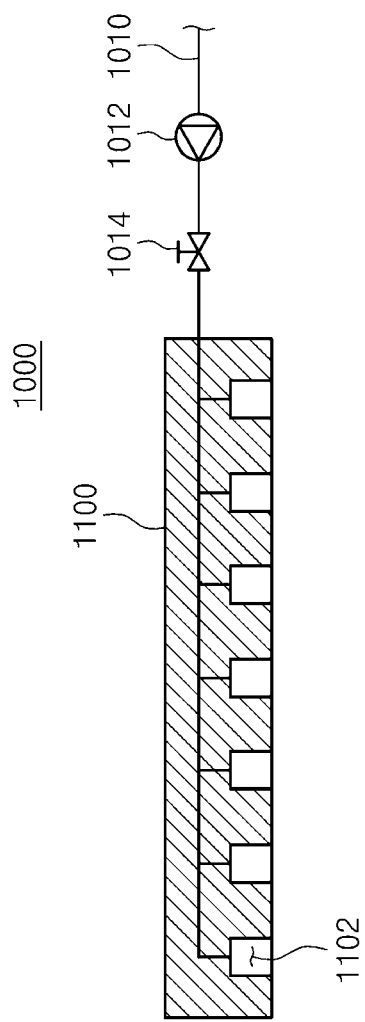
FIG. 4 is a cross-sectional view illustrating an impurity removal unit according to an embodiment of the inventive concept.

Hereinafter, the substrate floating unit 200 and an impurity removal unit 1000 according to the inventive concept will be described in detail with reference to FIGS. 3 and 4. FIG. 3 is a cross-sectional view illustrating the application module 40 of FIG. 2, and FIG. 4 is a cross-sectional view illustrating the impurity removal unit 1000 according to an embodiment of the inventive concept.

Referring to FIG. 3, the substrate floating unit 200, a nozzle unit 300, and the impurity removal unit 1000 are included. The application module 40 has a chamber 100. A treatment space in which the substrate "S" is treated is provided inside the chamber 100. The chamber 100 is provided to have a rectangular parallelepiped shape. An inlet and an outlet communicating with the carrying-in module 20 and the carrying-out module 60 are formed at front and rear ends of the chamber 100. According to one example, the inlet and outlet of the chamber 100 may be opened or closed. Atmospheric gas may be provided inside the chamber 100. According to one example, the atmosphere gas may be an inert gas. The inert gas may be nitrogen gas ($N_2$).

The substrate floating unit 200 transfers the substrate "S" in the treatment space in the second direction 14. The substrate floating unit 200 includes a stage 202, a pressure provision member 290, transfer rails 210, and gripping members 220. The stage 202 is located in the treatment space. In one example, the stage 202 is provided to have a rectangular parallelepiped shape. When viewed from above, the stage 202 is provided to have a rectangular shape which has a width set in the first direction 12 and of which a lengthwise direction faces the second direction 14. In one example, the substrate "S" is located in the stage 202, is then supported by the gripping members 220, and is moved in the lengthwise direction of the stage 202.

A positive pressure supply hole 204 and a negative pressure supply hole 206 are formed in the stage 202. The pressure provision member 290 is connected to the positive pressure supply hole 204 and the negative pressure supply hole 206. In one example, the pressure provision member 290 has a positive pressure provision member (not illustrated) that provides a positive pressure to the positive pressure supply hole 204 and a pressure reduction member that provides a negative pressure to the negative pressure supply hole 206. A gas is supplied to the positive pressure supply hole 204. The gas is sprayed through the positive pressure supply hole 204. The negative pressure is provided to the negative pressure supply hole 206. The negative pressure provided from a negative pressure supply line is transferred to the substrate "S" located on the stage 202 through the negative pressure supply hole 206. In one example, the positive pressure or the negative pressure may be selectively provided to the negative pressure supply hole 206 from the pressure provision member 290.

The gas and the negative pressure provided through the stage 202 allow the substrate "S" to float to a predetermined height from an upper surface of the stage 202. In one example, the stage 202 has a carrying-in part "A", an application part "B", and a carrying-out part "C". The carrying-in part "A" is a region through which the substrate "S" is moved into the application module 40 from the carrying-in module 20. The application part "B" is a region through which a treatment liquid is supplied onto the substrate "S". The carrying-out part "C" is a region through which the substrate "S" is carried out to the carrying-out module 60 from the application module 40.

The transfer rails 210 are located on both sides of the stage 202. The transfer rails 210 are provided so that a lengthwise direction thereof faces the second direction 14. The gripping members 220 are installed in the transfer rails 210, respectively. The gripping members 220 are provided to be movable in the second direction 14 along the transfer rails 210. The gripping members 220 support both edge regions of the substrate "S" floating due to the stage 202. The gripping members 220 may move in the second direction 14 together with the substrate "S" while supporting the substrate "S".

The nozzle unit 300 supplies the treatment liquid such as a liquid crystal onto the substrate "S" supported by the substrate floating unit 200. In one example, the nozzle unit 300 supplies the treatment liquid onto the substrate "S" in an inkjet manner. The nozzle unit 300 includes a gantry 310 and a head unit 400. The gantry 310 is provided above a path along which the gripping member 220 is moved. In one example, the gantry 310 is located outside the chamber 100.

For example, the gantry 310 is located in the atmospheric atmosphere. The gantry 310 is disposed to be spaced apart from an upper wall of the chamber 100 in a third direction 16. The gantry 310 has a bar shape of which a lengthwise direction faces the first direction 12. The gantry 310 has a length facing the first direction 12 that is longer than that of the stage 202. Both edges of the gantry 310 are supported by support shafts 320. The respective support shafts 320 are located on both sides of the chamber 100. Optionally, each support shaft 320 passes through the chamber 100 so that a lower region thereof may be located in the treatment space and an upper region thereof may be located in an external space of the chamber 100.

The head unit 400 is provided as a plurality of head units 400. In the present embodiment, it will be described that three head units 400 are provided. However, the number of head units 400 is not limited thereto, and two or less or four or more head units 400 may be provided. The head unit 400 is provided with a plurality of discharge heads 410. The discharge heads 410 are located in the treatment space through an opening of the chamber 100. Lower ends of the discharge heads 410 are provided as discharge ends through which the treatment liquid is discharged by the discharge heads 410. Thus, a lower region of the discharge head 410 is located in the treatment space, and an upper region thereof is located in the external space of the chamber 100. A plurality of treatment liquid nozzles (not illustrated) which discharge the treatment liquid are provided in the discharge head 410. For example, 128 or 258 treatment liquid nozzles (not illustrated) may be provided in each of the discharge heads 410. The treatment liquid nozzles (not illustrated) may be arranged in a line at predetermined pitch intervals. The treatment liquid nozzles (not illustrated) may discharge the liquid crystal in units of μg. Each head unit 400 may be provided with piezoelectric elements of which the number corresponds to the number of the treatment liquid nozzles (not illustrated), and droplet discharge amounts of the treatment liquid nozzles (not illustrated) may be adjusted independently of each other by controlling a voltage applied to the piezoelectric elements.

The impurity removal unit 1000 removes particles and the treatment liquid inside the positive pressure supply hole 204 and the negative pressure supply hole 206 provided in the stage 202. In one example, the impurity removal unit 1000 has a body 1100, air holes 1102, a pressure reduction member 1012, and a driver 1140. The air holes 1102 are formed in the body 1100. The pressure reduction member 1012 reduces the pressure of the air holes 1102 through a pressure reduction line 1104. A pressure reduction valve 1014 determines whether to reduce the pressure of the pressure reduction member 1012 provided to the air holes 1102.

A support member 1120 supporting the body 1100 is connected to the body 1100. The support member 1120 is connected to the driver 1140 to receive power. In one example, the driver 1140 moves the body 1100 between a removal location and a standby location in the second direction 14. In one example, the removal location is provided in a region corresponding to the stage 202 and the standby location is provided in an external region of the stage 202. In one example, the removal location is a location in which the body 1100 is provided to correspond to the application part "B". In one example, when the body 1100 moves between the standby location and the removal location, a height of the body 1100 is provided at a location in which there is no interference with the substrate "S", the gantry 310, and the discharge head 410 in the chamber 100.

In one example, when the impurity removal unit 1000 is placed in the removal location, the air holes 1102 are provided at a location corresponding to the positive pressure supply hole 204 and the negative pressure supply hole 206. Accordingly, when the positive pressure is provided through the positive pressure supply hole 204 and the negative pressure supply hole 206, the treatment liquid or particles inside the positive pressure supply hole 204 and the negative pressure supply hole 206 may escape therefrom and may be suctioned through the air holes 1102.

As the treatment liquid is supplied from the application part "B" onto the substrate "S", there is a high probability that the particles and the treatment liquid are introduced into the positive pressure supply hole 204 and the negative pressure supply hole 206 in the application part "B" compared to the carrying-in part "A" and the carrying-out part "C". Accordingly, the impurity removal unit 1000 removes impurities introduced into the positive pressure supply hole 204 and the negative pressure supply hole 206 at the application part "B". To this end, in one example, the cross-sectional area of the body 1100 is provided in a size corresponding to the cross-sectional area of the application part "B".

Figure 5:
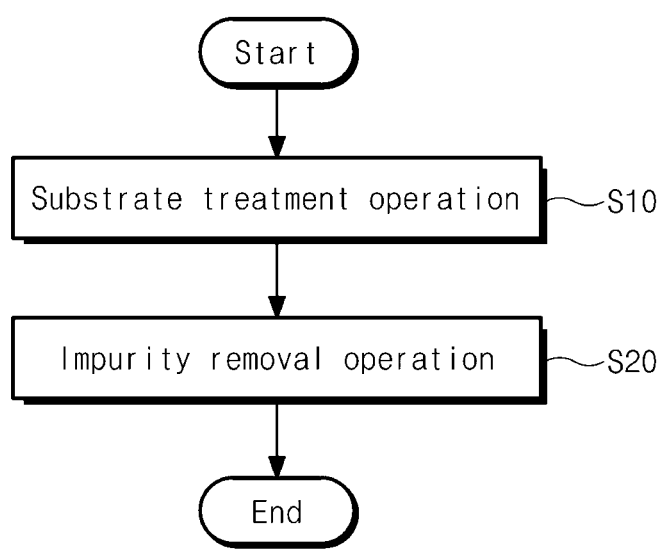
FIG. 5 is a flowchart illustrating a substrate treating method according to an embodiment of the inventive concept.
Figure 6:
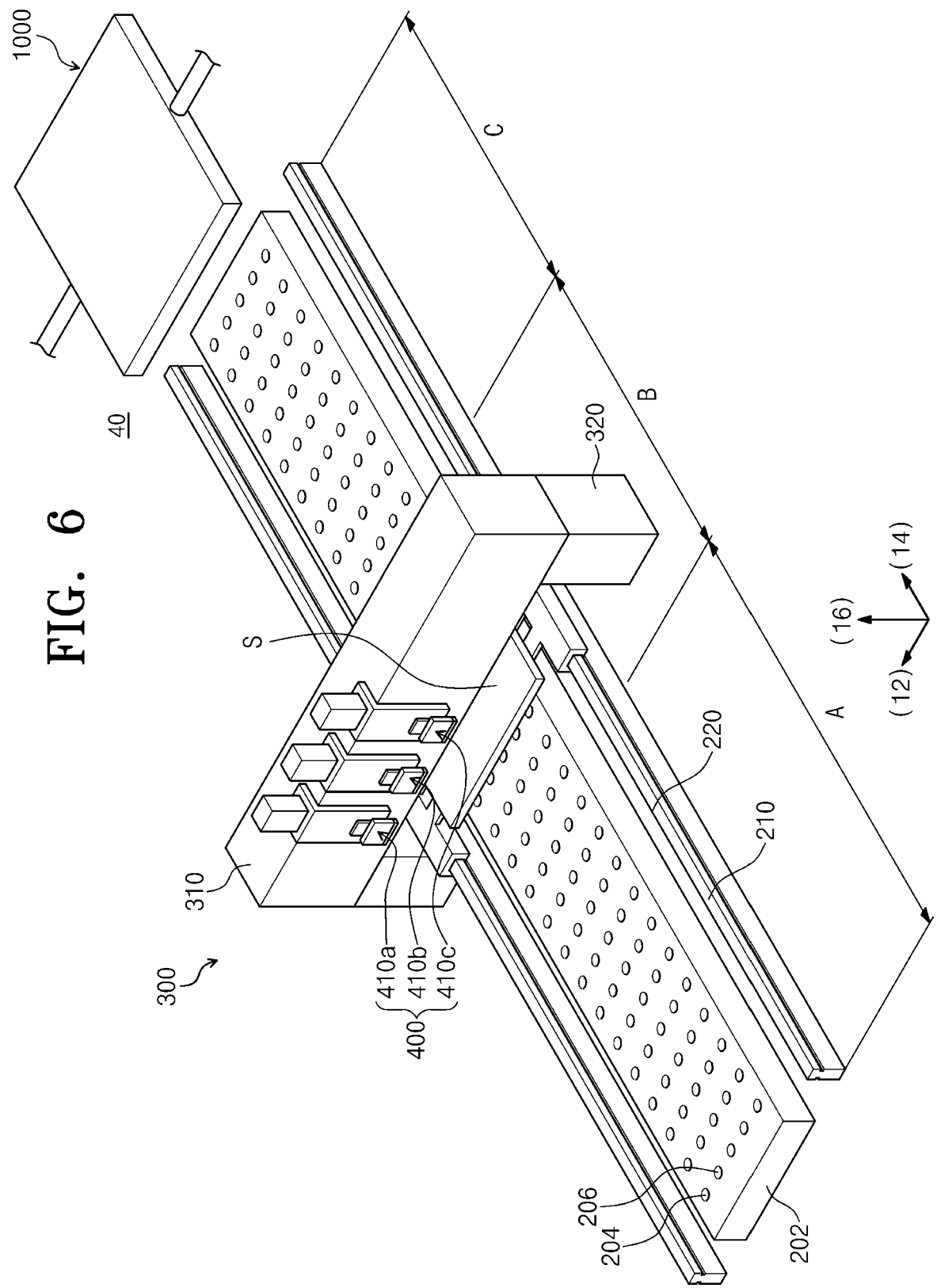
FIGS. 6 to 8 are views sequentially illustrating the substrate treating method according to an embodiment of the inventive concept.
Figure 7:
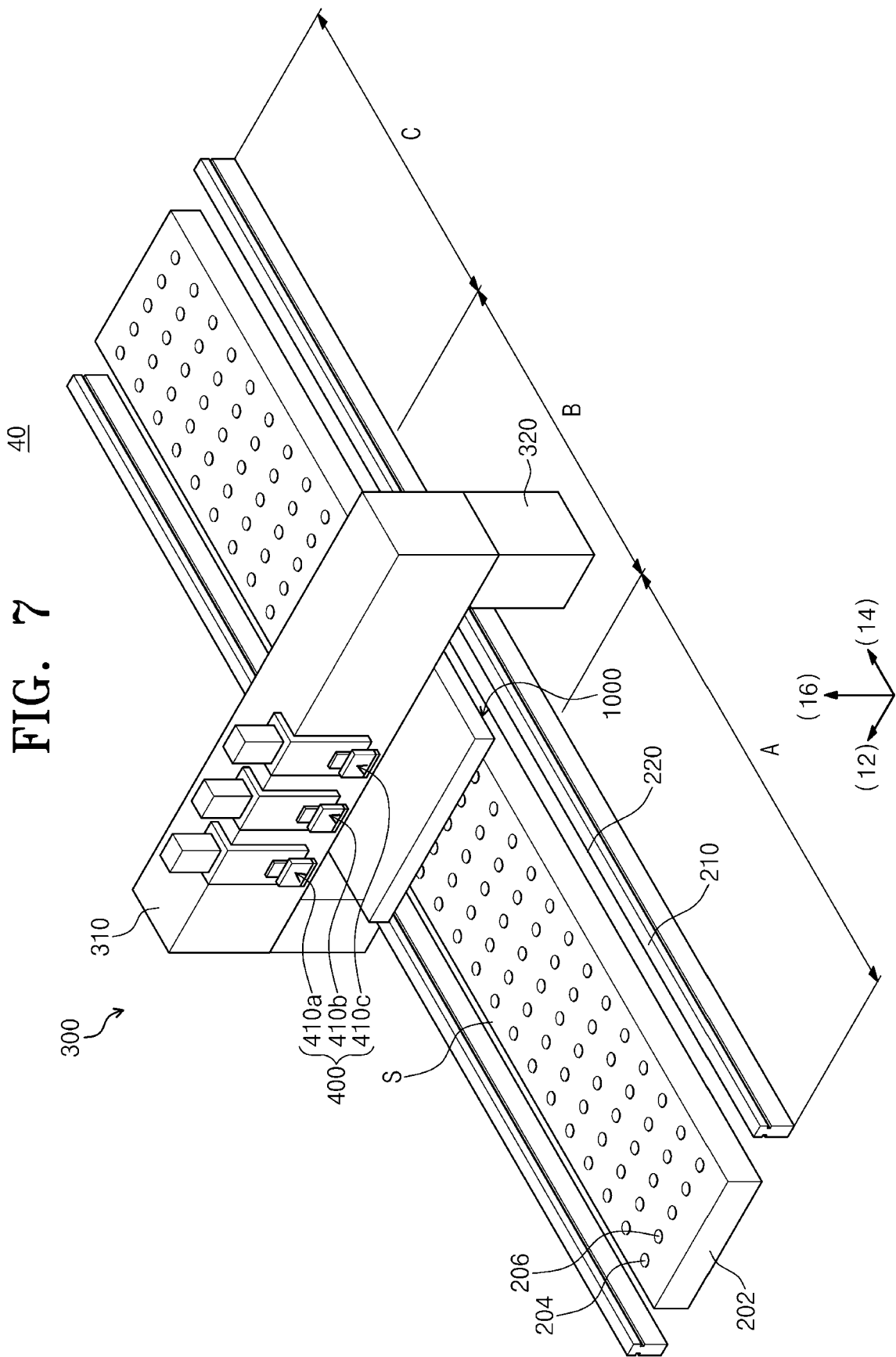
Figure 8:
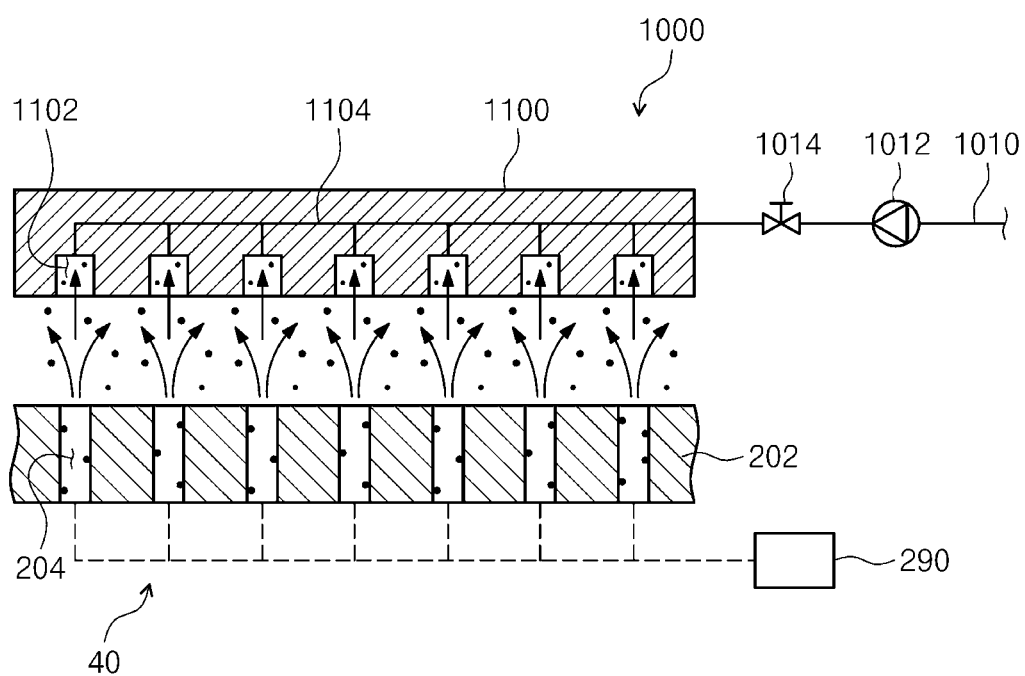

Hereinafter, a substrate treating method according to the inventive concept will be described with reference to FIGS. 5 to 8. FIG. 5 is a flowchart illustrating a substrate treating method according to an embodiment of the inventive concept, and FIGS. 6 to 8 are views sequentially illustrating the substrate treating method according to the embodiment of the inventive concept. A controller according to the inventive concept controls the substrate floating unit 200 and the impurity removal unit 1000 to perform the substrate treating method.

Referring to FIG. 5, the substrate treating method includes substrate treatment operation S10 and impurity removal operation S20. In substrate treatment operation S10, the nozzle unit 300 supplies the treatment liquid onto the substrate "S" in an inkjet manner. In substrate treatment operation S10, the substrate "S" is moved in the second direction 14 via the carrying-in part "A", the application part "B", and the carrying-out part "C". As illustrated in FIG. 6, in substrate treatment operation S10, the body 1100 is situated at the standby location.

After substrate treatment operation S10, impurity removal operation S20 is started. In one example, impurity removal operation S20 is started when the substrate "S" is located in the carrying-out part "C". As illustrated in FIG. 7, in impurity removal operation S20, the body 1100 is moved to a region corresponding to the application part "B". After the body 1100 is moved to the region corresponding to the application part "B", pressure reduction is provided from the pressure reduction member 1012 to the air holes 1102. While the pressure reduction is provided from the pressure reduction member 1012, a positive pressure is provided to the positive pressure supply hole 204 and the negative pressure supply hole 206. Accordingly, as illustrated in FIG. 8, the particles and the treatment liquid present inside the positive pressure supply hole 204 and the negative pressure supply hole 206 are discharged to an upper part of the stage 202. The particles and the treatment liquid discharged to the upper part of the stage 202 are introduced into the air holes 1102. The particles and the treatment liquid introduced into the air holes 1102 are discharged to the outside through the pressure reduction line 1104.

According to an embodiment of the inventive concept, impurities may be removed from a stage in which a hole is provided.

The effects of the inventive concept are not limited to the above-mentioned effects, and the unmentioned effects can be clearly understood by those skilled in the art to which the inventive concept pertains from the specification and the accompanying drawings.

The above detailed description exemplifies the inventive concept. Furthermore, the above-mentioned contents describe the exemplary embodiment of the inventive concept, and the inventive concept may be used in various other combinations, changes, and environments. That is, the inventive concept can be modified and corrected without departing from the scope of the inventive concept that is disclosed in the specification, the equivalent scope to the written disclosures, and/or the technical or knowledge range of those skilled in the art. The written embodiment describes the best state for implementing the technical spirit of the inventive concept, and various changes required in the detailed application fields and purposes of the inventive concept can be made. Accordingly, the detailed description of the inventive concept is not intended to restrict the inventive concept in the disclosed embodiment state. Furthermore, it should be construed that the attached claims include other embodiments.

What is claimed is:

1. A substrate treating apparatus comprising:
a substrate floating unit configured to float a substrate;
a gripping member configured to grip the substrate on the substrate floating unit;
a nozzle unit located above the substrate floating unit and configured to discharge a treatment liquid to a top surface the substrate in a first direction; and
an impurity removal unit configured to remove impurities in the substrate floating unit,
wherein the substrate floating unit includes:
a stage in which a plurality of holes are provided in an upper surface thereof, the gripping member moving the substrate on the stage in a second direction perpendicular to the first direction; and
a pressure provision member configured to provide a positive pressure or a negative pressure to an upper portion of the stage through the holes,
wherein the impurity removal unit includes:
a body;
a plurality of pressure reduction holes formed in the body;
a pressure reduction member configured to provide pressure reduction to the pressure reduction holes; and
a driver configured to move the body between a removal location and a standby location,
wherein the removal location is provided in a region corresponding to the stage, and the standby location is provided in an external region of the stage, and
wherein, in a plan view, the nozzle unit overlaps with the stage, such that, during the discharge of the treatment liquid, the nozzle unit, the substrate, and the stage are sequentially arranged in the first direction.

2. The substrate treating apparatus of claim 1, further comprising:
a controller configured to control the substrate floating unit and the impurity removal unit,
wherein the controller controls the impurity removal unit so that, after the substrate is removed from the stage, the impurity removal unit is moved from the standby location to the removal location to supply gas onto the stage.

3. The substrate treating apparatus of claim 2, wherein the controller controls the substrate floating unit so that, after the substrate is removed from the stage, the substrate floating unit provides the positive pressure to the upper portion of the stage through the holes.

4. The substrate treating apparatus of claim 2, wherein in the removal location, the pressure reduction holes are provided at locations corresponding to the holes.

5. The substrate treating apparatus of claim 1, wherein the stage has an application part that is a region in which the nozzle unit discharges the treatment liquid to the substrate, and
wherein the removal location is provided as a location in which the body corresponds to the application part.

6. The substrate treating apparatus of claim 5, wherein a cross-sectional area of the body is provided in a size corresponding to a cross-sectional area of the application part.

7. The substrate treating apparatus of claim 5, wherein the nozzle unit includes:
a nozzle through which the treatment liquid is supplied onto the substrate; and
a gantry supporting the nozzle at a region corresponding to the application part.

8. The substrate treating apparatus of claim 7, wherein the body is located so as not to interfere with the gantry and the substrate when being moved between the standby location and the removal location.

9. The substrate treating apparatus of any one of claims 1, wherein the nozzle discharges the treatment liquid onto the substrate in an inkjet manner.

10. A substrate treating apparatus comprising:
a substrate floating unit configured to float a substrate;
a gripping member configured to grip the substrate on the substrate floating unit;
a nozzle unit located above the substrate floating unit and configured to discharge a treatment liquid to a top surface of the substrate in a first direction; and
an impurity removal unit configured to remove impurities in the substrate floating unit,
wherein the substrate floating unit includes:
a stage in which a plurality of holes are provided in an upper surface thereof, the gripping member moving the substrate on the stage in a second direction perpendicular to the first direction; and
a pressure provision member configured to provide a positive pressure or a negative pressure to an upper portion of the stage through the holes,
wherein the stage has an application part that is a region in which the nozzle unit discharges the treatment liquid to the substrate,
wherein the impurity removal unit is configured to provide pressure reduction onto the stage in a region corresponding to the application part, and
wherein, in a plan view, the nozzle unit overlaps with the stage, such that, during the discharge of the treatment liquid, the nozzle unit, the substrate, and the stage are sequentially arranged in the first direction.

11. The substrate treating apparatus of claim 10, wherein the impurity removal unit includes:
a body;
a plurality of pressure reduction holes formed in the body;
a pressure reduction member configured to reduce pressures in the pressure reduction holes; and
a driver configured to move the body between a removal location and a standby location, and
wherein the removal location is provided in a region corresponding to the application part, and the standby location is provided in an external region of the stage.

12. The substrate treating apparatus of claim 11, further comprising:
a controller configured to control the substrate floating unit and the impurity removal unit,
wherein the controller controls the impurity removal unit so that, after the substrate is removed from the stage, the impurity removal unit is moved from the standby location to the removal location to supply gas onto the stage.

13. The substrate treating apparatus of claim 12, wherein the controller controls the substrate floating unit so that, after the substrate is removed from the stage, the substrate floating unit provides the positive pressure to the upper portion of the stage through the holes.

14. The substrate treating apparatus of claim 11, wherein in the removal location, the pressure reduction holes are provided at locations corresponding to the holes.

15. The substrate treating apparatus of claim 11, wherein a cross-sectional area of the body is provided in a size corresponding to a cross-sectional area of the application part.

16. The substrate treating apparatus of any one of claims 10, wherein the nozzle unit includes:
a nozzle through which the treatment liquid is supplied onto the substrate; and
a gantry supporting the nozzle at a region corresponding to the application part.

17. The substrate treating apparatus of claim 16, wherein the nozzle discharges the treatment liquid onto the substrate in an inkjet manner.

18. A method of treating a substrate using the substrate treating apparatus of claim 11, the method comprising:
treating the substrate; and
after the treating of the substrate, removing impurities in the stage using the impurity removal unit,
wherein in the removing of the impurities, the body is moved to a region corresponding to the application part, and pressure reduction is provided to the pressure reduction holes.

19. The method of claim 18, wherein in the removing of the impurities, the positive pressure is provided to the stage.

20. The method of claim 18, wherein in the treating of the substrate, the nozzle unit supplies the treatment liquid onto the substrate in an inkjet manner.

* * * * *